(12) United States Patent
Wadley

(10) Patent No.: US 7,021,536 B2
(45) Date of Patent: Apr. 4, 2006

(54) RETAIL CONSUMER INFORMATION METHODS AND RETAIL CONSUMER INFORMATION SYSTEM

(75) Inventor: Donald K. Wadley, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 317 days.

(21) Appl. No.: 10/284,563

(22) Filed: Oct. 29, 2002

(65) Prior Publication Data

US 2004/0079797 A1 Apr. 29, 2004

(51) Int. Cl.
*G06K 15/00* (2006.01)
(52) U.S. Cl. .................... 235/383; 235/381
(58) Field of Classification Search .......... 235/383, 235/380, 375, 492, 493, 486, 487, 382; 705/10, 705/26, 41, 43, 44; 340/693.3, 10.1, 10.2, 340/539.1, 539.13
See application file for complete search history.

(56) References Cited

U.S. PATENT DOCUMENTS

| | | | |
|---|---|---|---|
| 5,870,716 A * | 2/1999 | Sugiyama et al. ............. 705/26 |
| 6,137,411 A | 10/2000 | Tyren | |
| 6,279,170 B1 | 8/2001 | Chu | |
| 6,309,690 B1 * | 10/2001 | Brogger et al. ................. 427/7 |
| 6,653,937 B1 * | 11/2003 | Nelson et al. ............. 340/539.1 |
| 6,747,560 B1 * | 6/2004 | Stevens, III ............. 340/572.4 |
| 2004/0056091 A1 * | 3/2004 | Overhultz et al. ........... 235/382 |
| 2005/0006466 A1 * | 1/2005 | Overhultz et al. ........... 235/383 |
| 2005/0040961 A1 * | 2/2005 | Tuttle ....................... 340/693.3 |

OTHER PUBLICATIONS http://www.rf-id.com/parcel.htm; "RF-ID Parcel Shipping With Tag-It Tag Technology Solutions"; Oct. 17, 2002; 1 page.
http://www.rf-id.com/product.htm; "RF-ID Product Tracking Using RFID Tag Transponders"; Oct. 17, 2002; 1 page.
http://www.rf-id.com/airline.htm; "RF-ID Airline Baggage Tag-It Tag Technology Solutions"; Oct. 17, 2002; 1 page.
http://www.rf-id.com/beerkeg.htm; "Beer Keg Tracking"; Oct. 17, 2002; 1 page.
http://www.rf-id.com/rfidtech.htm; "RF-ID Technology Desctiption And RFID Performance Examples"; Oct. 17, 2002; 3 pages.
http://www.rf-id.comcomautomoti.htm; "RFID Tag/Transponder Automotive Technology Solutions"; Oct. 17, 2002; 2 pages.

* cited by examiner

*Primary Examiner*—Thien M. Le

(57) ABSTRACT

A customer e-label apparatus and method includes an electronic tag for storing information electronically. A device for writing information on the electronic tag at the point of sale of an item to a customer is provided at the point of sale. An attachment device is provided for attaching the electronic tag to the customer's item at the point of sale.

29 Claims, 2 Drawing Sheets

RETAIL CONSUMER INFORMATION METHODS AND RETAIL CONSUMER INFORMATION SYSTEM

BACKGROUND OF THE INVENTION

The marketing of consumer goods in today's society is a complex process made more complex by the needs of both the consumer and the marketer. On the one hand, for the consumer to take advantage of warranties, return and replacement options, servicing and other options concerning a particular consumer item, the consumer/customer must provide evidence of ownership. Typically this means, at a minimum, a sales receipt. For high dollar investments, such as cars and boats and the like, proof of ownership is provided in the nature of an owner's title. Clearly, the vast majority of consumer purchases are not for such high dollar consumer items and yet, the need for proof of ownership for other purchases is often just as great. The difficulty of retaining sales receipts, their transitory nature, and their sheer number, however, places a burden on the customer.

On the other hand, marketers offering consumer items to customers know that their business depends upon accepting returned consumer items in appropriate circumstances. A tension, however, results when the customer cannot produce proof of ownership when attempting to return an item.

Additionally, in an effort to better serve customers, marketers spend enormous amounts of money attempting to accumulate data about "qualified" buyers. Qualified buyers are buyers, for example, who actually made a purchase in the marketer's store. Warranty information cards obtain such qualified buyer information assuming the customer takes the time and effort to fill out and return the warranty card. Some marketers require the customer's phone number as a way of obtaining qualified data, such as the street address, city, and state of the customer. These and other known methods of obtaining qualified data are labor-intensive, difficult to obtain and difficult to relate to a particular consumer purchase.

In a related area of interest for marketers, successful creation of a qualified buyer database enables marketers to provide customized, customer specific, services. It is profitable for marketers to provide such customized service. However, while it is easy to track the buying habits of well-known, wealthy consumers, it is difficult to track the buying habits of the much more numerous and profitable "non-wealthy" consumers.

DETAILED DESCRIPTION OF THE INVENTION

Figure 1:
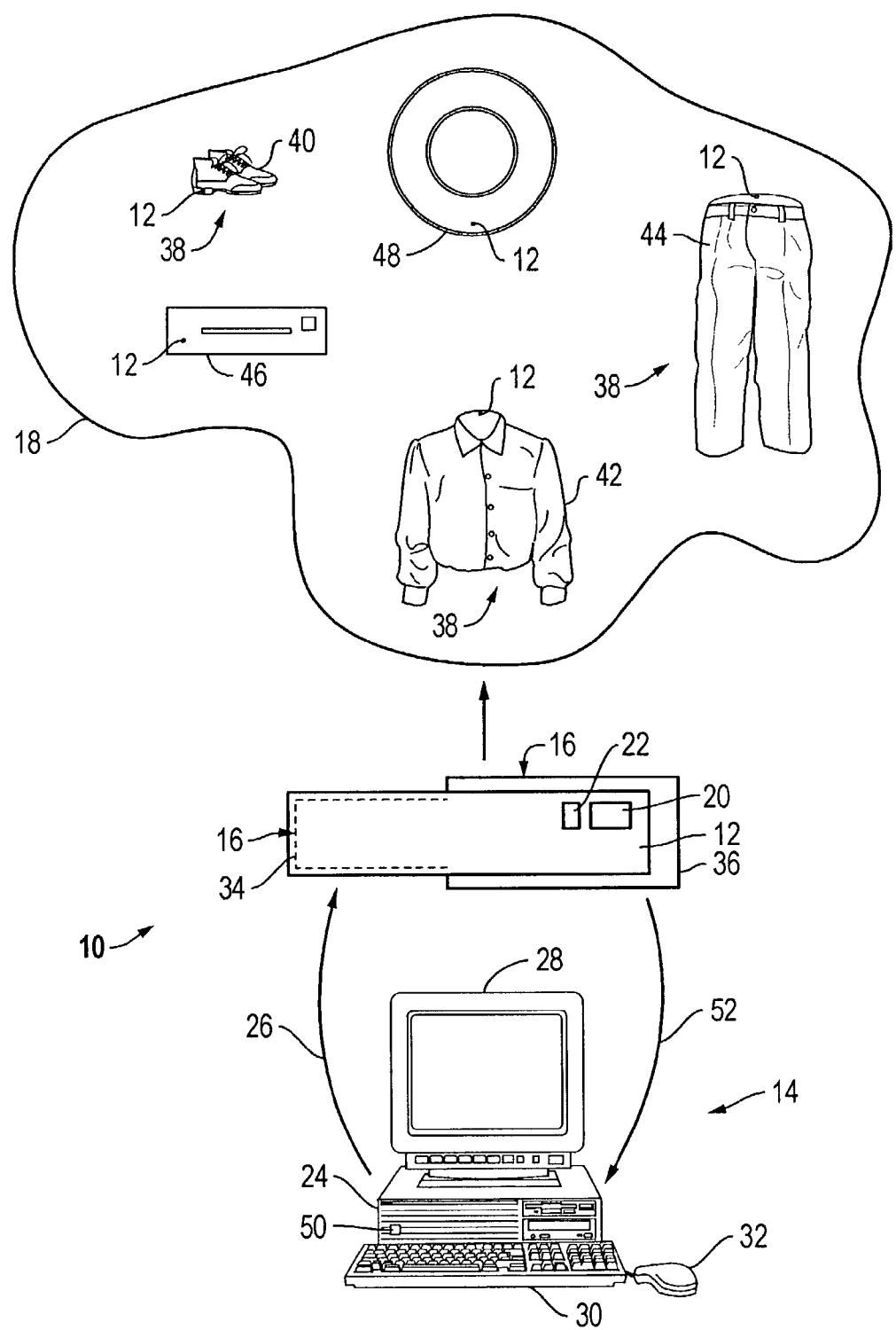
FIG. 1 is a schematic diagram of the customer e-label apparatus according to one embodiment of the present invention.
Figure 2:
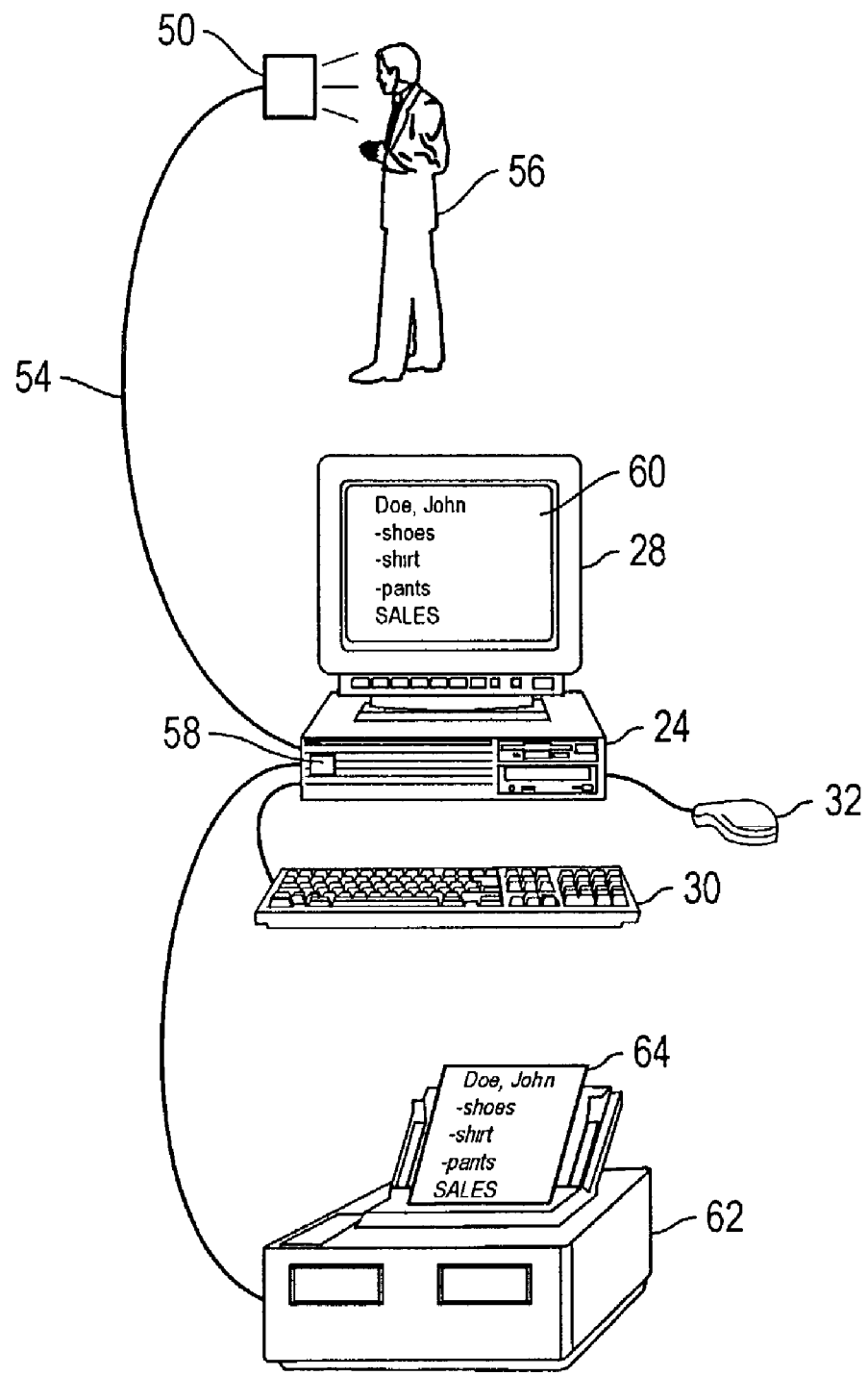
FIG. 2 is a schematic diagram of another aspect of the invention of FIG. 1 according to one embodiment.

An embodiment of the present invention is illustrated by way of example in FIGS. 1–2. With specific reference to FIG. 1, a customer e-label apparatus 10, according to one embodiment of the present invention, includes an electronic tag 12 and writer 14. Attachment devices 16 are provided for attaching the electronic tag 12 to consumer items 18 at the point of sale of consumer items 18.

Electronic tag 12 may be any type of electronic tag that includes read-write tags which allow writing and rewriting of information and read only tags which may be read only or may be written once and read many times. Additionally, electronic tag 12 may be a passive tag meaning there is no on-tag power source and no on-tag transmitter. Further, for the purposes of the present invention, electronic tag 12 may be a semi-passive tag meaning there is an on-tag power source 20, but there is no active transmitter. Additionally, electronic tag 12 may include, for the purposes of this invention, active tags in which there is in on-tag power source 20 as well as an on-tag active transmitter 22. Again, electronic tag 12 includes any type of electronic tag, power source, and/or transmitter.

Writer 14 includes any type of electronic tag 12 writer that includes a computer processing unit 24 conformed to write information on electronic tag 12. As illustrated in FIG. 1, computer processing unit 24 writes information on the electronic tag 12 in the direction of arrow 26. As is known in the art, computer processing unit 24 may write information in the direction of arrow 26 on electronic tag 12 by means of a hard wire or a wireless connection. According to one embodiment of the invention, writer 14 includes computer processing unit 24, monitor 28, keyboard 30 and mouse 32.

Attachment device 16 is any device for attaching electronic tag 12 to consumer items 18. As illustrated in FIG. 1, attachment device 16 may include, for example only, stitching 34 or adhesive 36. Because electronic tag 12 is designed to be attached to consumer items 18, electronic tag 12 is small. By way of example, and not by limitation, electronic tag 12 according to one embodiment of the invention may be approximately ⅛ of an inch wide and ¼ inch long. As a result, electronic tag 12 may be attached unobtrusively to consumer items 18 in any desired location.

Still referring to FIG. 1, consumer items 18 include any consumer item available today. By way of example only, and not by limitation, consumer items 18 include clothing items 38 for example, shoes 40, shirts 42 and pants 44. Additionally, again by example only, consumer items 18 include electronic equipment (VCR/DVD/stereo device) 46 and tires 48. While stitching 34 is useful to attach electronic tag 12 to items of clothing 38, adhesives 36 may be more appropriate for attaching electronic tag 12 to electronic equipment 46 and/or tires 48.

In another aspect of the invention, an electronic tag reader 50 is also provided. Electronic tag reader 50 may be any type of electronic tag reader that includes contact and non-contact readers. In one embodiment of the invention, electronic tag reader 50 is conformed to operate on, and be operated by, computer processing unit 24. In this embodiment, computer processing unit 24 includes electronic tag reader 50 for receiving information in the direction of arrow 52 from electronic tag 12.

Referring now to FIG. 2, another aspect of the invention, according to one embodiment, is disclosed. As illustrated, electronic tag reader 50 is remotely located from computer processing unit 24. Electronic tag reader 50 is connected, however, to computer processing unit 24 by means of connection 54 which may be a hard wire or a wireless connection. As customer 56 passes by electronic tag reader 50, electronic tag reader 50 assimilates and transmits information previously written on electronic tags 12 (FIG. 2) to computer processing unit 24. Electronic tag reader 50 may be located, for example only, at the entrance of a particular store, in the aisles of a large mall or complex of stores, at the entrance to a complex of stores, or any desired remote location convenient for the assimilation of such data. In one aspect of the invention, database 58 is created on computer processing unit 24 for receiving, storing, and manipulating customer 56 data obtained by electronic tag reader 50 from electronic tags 12 attached to consumer items 18 worn or carried by customer 56.

As illustrated in FIG. 2, once electronic tag reader 50 obtains electronic tag 12 information, database 58 may display that information to a salesperson for use by the salesperson in providing enhanced services to customer 56. Information display 60 shown on monitor 28 includes relevant customer 56 information such as name, types of consumer items 18 worn or carried and current sales prices and locations of the same or similar consumer items 18. Armed with this information, the type of information easily obtained for the purposes of serving the well-known and wealthy, the sales clerk can confidently approach customer 56 with a customer profile specific to customer 56 only and service customer 56 in a highly focused and specialized manner heretofore reserved for the very rich.

In another aspect of an embodiment of the invention, printer 62 is connected to computer processing unit 24 such that information contained on database 58 may be reduced to a tangible printed form 64 for use by the sales clerk and/or delivery directly to customer 56.

Electronic tag 12 may include any type of information desired and/or relevant to consumer items 18. That is, for example only, for the purposes of proving ownership, electronic tag 12 may include customer's 56 name, address, and Social Security number, among other things. For the purposes of gathering qualified buyer data for database 58, information written to and read from electronic tag 12 may include, for example only, manufacturer name, consumer items' 18 brand, size, type, style, and color. Obviously, electronic tag 12 may provide a customer e-label for any appropriate purpose. For example only, and again not by limitation, electronic tag 12 may be attached to tire 48 and include warranty information such as warranty turn on date, valid period, and service dates. Extraordinarily valuable qualified data may thereby be obtained every time the tire 48 is brought in for service.

According to one aspect of the invention, in a marketing system including at least one computer, such as computer processing unit 24, monitor 28, keyboard 30, and mouse 32, where goods, consumer items 18, are sold to customers 56 and an electronic tag 12 is attached to the consumer item 18 at the point-of-sale so as to create a customer e-label 10, a program product is provided in accordance with the present invention. The program product includes instructions for identifying the customer e-label, electronic tag 12, selected from a group including read-write and read only e-labels and passive, semi-passive and active e-labels. The program product also includes instructions for writing information to the customer e-label and instructions for reading information on the customer e-label. In another aspect of the invention, the program product includes instructions for creating a database of information read from the customer e-labels and instructions for creating a display of information obtained from reading the customer e-labels on the computer.

The description of the present embodiments of the invention has been presented for purposes of illustration, but these embodiments are not intended to be exhaustive or to limit the invention to the form disclosed. Many modifications and variations will be apparent to those of ordinary skill in the art. As such, while the present invention has been disclosed in connection with an embodiment thereof, it should be understood that there may be other embodiments which fall within the spirit and scope of the invention as defined by the following claims.

What is claimed is:

1. A retail consumer information method comprising:
using a computing system associated with a retailer, first accessing information regarding a purchaser of an item from the retailer at the time of purchase;
storing the information using an electronic communications device;
associating the electronic communications device with the item;
after the time of purchase and the associating, second accessing the information from the electronic communications device; and
communicating the information accessed from the electronic communications device to an individual associated with the retailer to assist the individual with service of the purchaser.

2. The method of claim 1 wherein the storing the information comprises storing identification information of the purchaser.

3. The method of claim 1 wherein the storing the information comprises storing information void of information regarding the item.

4. The method of claim 1 further comprising storing information regarding the item using the electronic communications device.

5. The method of claim 1 further comprising, using the computer system and the information accessed from the electronic communications device, accessing additional information not stored on the electronic communications device, and wherein the communicating comprises communicating the additional information.

6. The method of claim 5 wherein the additional information pertains to another item offered for sale by the retailer and different from the item purchased.

7. The method of claim 6 wherein the another item is associated with the item purchased.

8. The method of claim 6 wherein the additional information comprises sales price of the another item.

9. The method of claim 5 wherein the accessing additional information comprises accessing the additional information from a database of the computer system.

10. The method of claim 1 wherein the first accessing comprises accessing at a store of the retailer, and further comprising detecting presence of the electronic communications device at the store after the time of purchase and wherein the second accessing is responsive to the detecting.

11. The method of claim 1 wherein the first accessing comprises accessing at a store of the retailer, and further comprising detecting presence of the electronic communications device at another store of the retailer after the time of purchase and wherein the second accessing is responsive to the detecting.

12. The method of claim 1 further comprising receiving payment from the purchaser for the item and wherein the storing comprises storing after the receiving payment.

13. The method of claim 1 wherein the associating comprises attaching the electronic communications device to the item.

14. A retail consumer information system comprising:
an input system configured to receive an indication that a purchaser is desirous of purchasing an item from a retailer, wherein the input system is further configured to receive information regarding the purchaser at a time of purchase of the item;

a writer configured to communicate with respect to an electronic communications device; and processing circuitry coupled with the input device and the writer and configured to control the writer to store the information regarding the purchaser using the electronic communications device at the time of purchase of the item, and wherein the electronic communications device is associated with the item.

15. The system of claim 14 wherein the information stored using the electronic communications device comprises identification information of the purchaser.

16. The system of claim 14 wherein the information stored using the electronic communications device is void of information regarding the item.

17. The system of claim 14 wherein the processing circuitry is configured to control the writer to store information regarding the item using the electronic communications device.

18. The system of claim 14 further comprising a reader configured to receive the information from the electronic communications device at a moment in time after the time of purchase of the item.

19. The system of claim 18 wherein the reader is configured to receive the information at a location of the retailer where the item was purchased.

20. The system of claim 18 wherein the reader is configured to receive the information at a location of the retailer different from a location of the retailer where the item was purchased.

21. The system of claim 18 wherein the processing circuitry is configured to control communication of the information received from the electronic communications device to an individual associated with the retailer to assist the individual with service of the purchaser after the time of purchase of the item.

22. The system of claim 21 further comprising a display and wherein the processing circuitry is configured to control the display to communicate the information to the individual.

23. The system of claim 21 further comprising a printing device and wherein the processing circuitry is configured to control the printing device to communicate the information to the individual.

24. The system of claim 21 wherein the processing circuitry is configured to access additional information using the information received from the electronic communications device and to control communication of the additional information to the individual.

25. The system of claim 24 wherein the additional information comprises information regarding another item offered for sale by the retailer.

26. The system of claim 25 wherein the another item is associated with the item purchased by the purchaser.

27. The system of claim 25 wherein the additional information comprises sales price of the another item.

28. The system of claim 24 wherein the additional information is not pertinent to the purchased item.

29. The system of claim 24 further comprising storage circuitry configured to store a database, and wherein the processing circuitry is configured to access the database using the information received from the electronic communications device to access the additional information.

* * * * *

UNITED STATES PATENT AND TRADEMARK OFFICE
CERTIFICATE OF CORRECTION

PATENT NO. : 7,021,536 B2 Page 1 of 1
APPLICATION NO. : 10/284563
DATED : April 4, 2006
INVENTOR(S) : Donald K. Wadley It is certified that error appears in the above-identified patent and that said Letters Patent is hereby corrected as shown below:

On the title page, item (54), in "Title", in column 1, line 3, delete "SYSTEM" and insert -- SYSTEMS --, therefor.

In column 1, line 3, delete "SYSTEM" and insert -- SYSTEMS --, therefor.

Signed and Sealed this

Second Day of June, 2009

JOHN DOLL
*Acting Director of the United States Patent and Trademark Office*